(12) United States Patent
Ewing

(10) Patent No.: US 12,028,307 B2
(45) Date of Patent: *Jul. 2, 2024

(54) LOCATION-BASED MESSAGING SYSTEM

(71) Applicant: CALLFIRE, INC., Santa Monica, CA (US)

(72) Inventor: April Patrice Ewing, Los Angeles, CA (US)

(73) Assignee: CALLFIRE, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,436

(22) Filed: Feb. 13, 2023

(65) Prior Publication Data

US 2023/0412550 A1    Dec. 21, 2023

Related U.S. Application Data

(63) Continuation of application No. 17/249,165, filed on Feb. 22, 2021, now Pat. No. 11,582,180, which is a continuation of application No. 16/912,283, filed on Jun. 25, 2020, now Pat. No. 10,931,616.

(60) Provisional application No. 62/867,105, filed on Jun. 26, 2019.

(51) Int. Cl.
| | |
|---|---|
| *H04L 51/222* | (2022.01) |
| *H04L 51/58* | (2022.01) |
| *H04L 67/306* | (2022.01) |
| *H04W 4/02* | (2018.01) |
| *H04W 4/90* | (2018.01) |

(52) U.S. Cl.
CPC .......... *H04L 51/222* (2022.05); *H04L 51/58* (2022.05); *H04L 67/306* (2013.01); *H04W 4/023* (2013.01); *H04W 4/90* (2018.02)

(58) Field of Classification Search
CPC ..... H04L 51/222; H04L 51/58; H04L 67/306; H04W 4/90; H04W 4/023
USPC ........................................................ 709/206
See application file for complete search history.

(56) References Cited

U.S. PATENT DOCUMENTS

| | | | |
|---|---|---|---|
| 8,965,417 B2 | 2/2015 | Lohtia | |
| 10,931,616 B1 | 2/2021 | Ewing | |
| 2001/0029430 A1 | 10/2001 | Tamura | |
| 2002/0058550 A1* | 5/2002 | Pace | G06Q 10/109 463/42 |
| 2004/0254990 A1 | 12/2004 | Mittal | |
| 2010/0185391 A1* | 7/2010 | Lee | G06F 16/9537 715/255 |
| 2011/0173092 A1* | 7/2011 | Werbitt | G06Q 30/02 705/26.8 |
| 2015/0331881 A1 | 11/2015 | Myles | |
| 2016/0062984 A1 | 3/2016 | Caliendo, Jr. et al. | |
| 2021/0258274 A1 | 8/2021 | Ewing | |

* cited by examiner

*Primary Examiner* — Zi Ye
(74) *Attorney, Agent, or Firm* — Knobbe, Martens, Olson & Bear, LLP

(57) ABSTRACT

Systems and methods for managing location-based messaging are provided. The location-based messaging may occur between users within a particular venue. A location-based messaging system may facilitate messaging between event attendees and service personnel at the venue, such as during times of emergency or other times when the location of one user is to be sent to and used by another user.

20 Claims, 8 Drawing Sheets

LOCATION-BASED MESSAGING SYSTEM

CROSS-REFERENCE TO RELATED APPLICATION

This application is a continuation of U.S. patent application Ser. No. 17/249,165, filed Feb. 22, 2021, which is a continuation of U.S. patent application Ser. No. 16/912,283, filed Jun. 25, 2020, which claims priority to U.S. Provisional Patent Application No. 62/867,105, filed Jun. 26, 2019, the contents of each of which are incorporated by reference herein.

BACKGROUND

Electronic devices may be used to exchange information over communication networks. For example, a mobile phone may be used to generate a text message (also referred to as a short message service message or "SMS" message). The mobile phone may send the text message to another mobile phone over the public switched telephone network ("PSTN"). A user of the other mobile phone can view the text message and respond with a text message reply, if desired. Some mobile phones are configured to send and/or receive images, video, and other media information in addition to text messages. For example, some mobile phones may generate and transmit multimedia messaging service ("MIMS") messages to other mobile devices.

Some mobile devices may be capable of executing application software and accessing a packet switched data network, such as a local area network ("LAN") or the Internet. Such mobile devices may be referred to as "smart devices," and include smart phones, tablets, and the like. Smart devices may use email, instant messaging, chat, or other application software to generate messages and send them to other devices over data networks. The recipients may be other smart devices, traditional computing devices (e.g., desktop or notebook computers), or other electronic devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
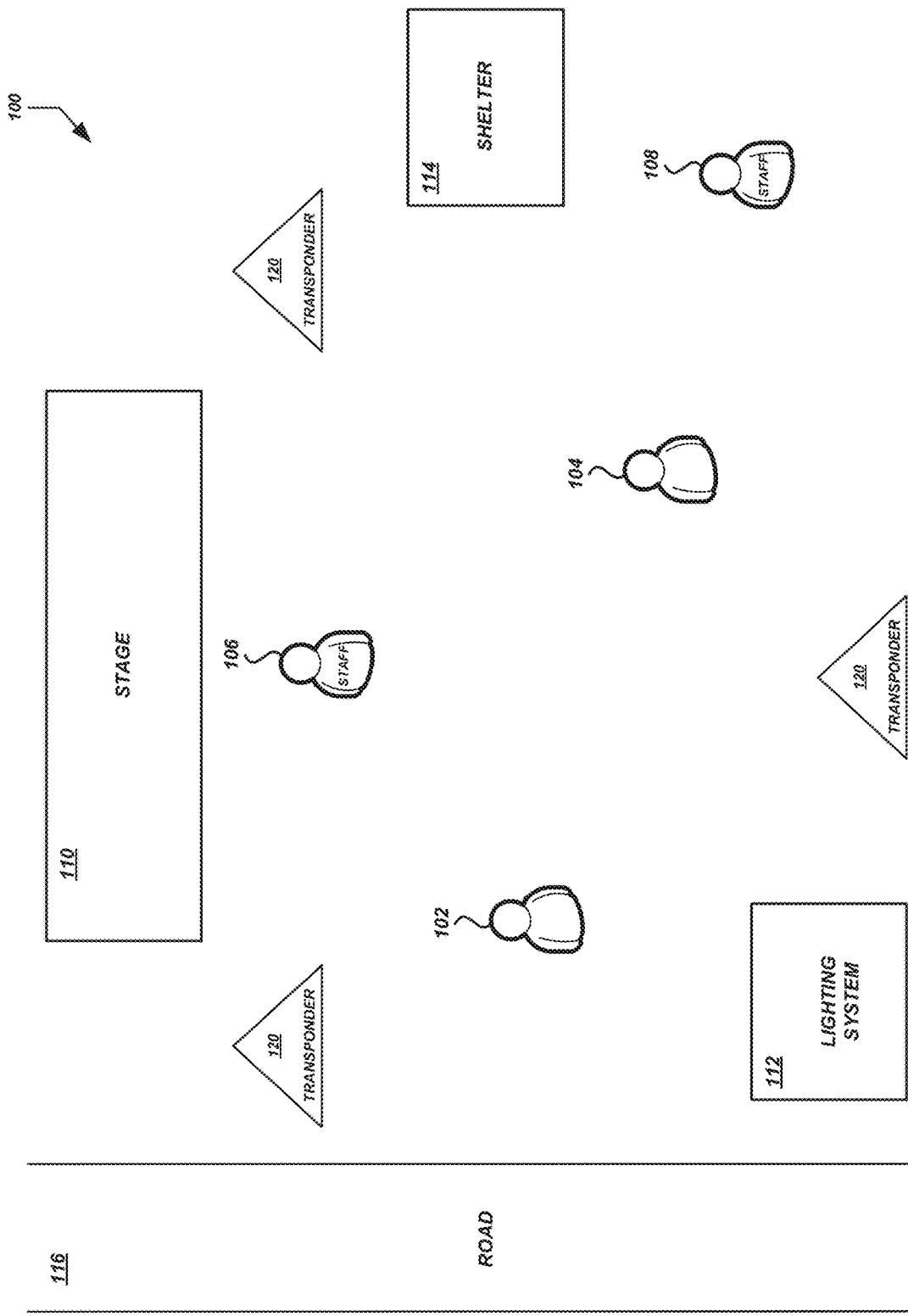
FIG. 1 is a block diagram of an illustrative environment including multiple user devices according to some embodiments.

The present disclosure is directed to systems and methods for managing location-based messaging. The location-based messaging may occur between users within a particular venue. A location-based messaging system may facilitate messaging between event attendees and service personnel at the venue, such as during times of emergency or other times when the location of one user is to be sent to and used by another user.

Individuals using conventional messaging systems, such as short message service ("SMS") systems that rely on cellular networks and/or the public switched telephone network ("PSTN"), may experience issues when sending messages in a crowded or remote area, such as an event venue. For example, service delays or outages may occur during surges in call or messaging volume concentrated in a particular area. Service delays and outages prevent individuals from being able to find each other and report emergencies or other incidents in a timely manner. Such service delays and outages also interfere with service personnel, such as security authorities or emergency medical technicians ("EMTs"), when responding to severe situations, thus increasing the likelihood of health and security issues that can sometimes be fatal. Some venues provide service personnel with dedicated two-way radios for use during an event. In the case of an emergency, the service personnel may connect to a particular channel to communicate. Information regarding important locations (e.g., locations of threats, emergencies, etc.) is provided using a verbal description of the location (e.g., a three-point reference). However, such verbal descriptions may not be accurate, may not be heard by a recipient in a loud environment (such as a concert or during an emergency), or may otherwise not be easily understood or used by the recipient to go to the location. In addition, the two-way radios may be expensive, and the specialized hardware may only be available to a subset of service personnel.

Some aspects of the present disclosure address, among other things, shortcomings with conventional messaging and location communication within venues, such as the shortcomings described above. In some embodiments, user computing devices, such as mobile phones, may be configured with application software or dedicated application hardware. User computing devices may also be referred to simply as "user devices" for convenience. The application may cause the user devices to communicate messages to other user devices without using certain conventional messaging systems, such as those that rely on cellular networks and/or the PSTN. For example, the application may cause user devices to communicate via wireless-enabled transponders that are positioned within the venue and configured to relay messages to other transponders and between user devices within the venue. As another example, the application may cause user devices to wirelessly communicate directly with other user devices (e.g., using direct communication channels between sender device and recipient device, using mesh networking to transmit a message from a sender device to a recipient device via one or more intermediate devices, etc.). By configuring user devices such as mobile phones to use local, in-venue communication methods, the application can allow user devices to take the place of separate dedicated devices such as two-way radios.

Additional aspects of the present disclosure relate to including location information in the messages. Messages that include such location information may be referred to as location-based messages. Users may include location information in their messages to recipients, or otherwise provide location information to the recipients. The location information may be objective location information in the form of coordinates or address information, rather than subjective descriptions that are typically provided verbally via two-way radios, or textually via text-based messages. For example, a user device may automatically determine a location using global positioning system ("GPS") coordinates, real-time locating system ("RTLS") reference points, Wi-Fi positioning system ("WPS") techniques, wireless triangulation using transponders, or the like. As another example, a user may identify a location on visual map displayed on the user device, and the location may be converted into objective location information. The visual map may be a customized map of the venue, such as a graphic or satellite image with visual indicators of landmarks, including temporary landmarks that may be present for the current event only (e.g., stages, booths, tents, and the like within a venue). Thus, a user may more accurately indicate their current location by placing a marker or otherwise selecting a location with respect to landmarks currently present, and the user-indicated location may be processed into objective location information. The objective location information (coordinates, address, etc.) may be embedded within a message that is sent to another user device within the venue. For example, the objective location information may be embedded within a text message that the user wishes to send, or the objective location information may be part of a separate location-only message. A recipient's user device can display a visual map indicating the sender's exact location as the location was automatically determined or manually determined and processed by the sender's user device. In some embodiments, the recipient's user device may provide dynamic directions or a location indicator that reacts to changes in location or orientation of the recipient's user device. For example, the recipient's user device may display a virtual compass needle, such as a moving arrow that remains pointed in the direction of the sender's physical location within the venue, regardless of the orientation of the recipient's user device. As another example, the recipient's user device may display a visual map indicating the sender's location and the recipient's location. The combination of objective location information from the sender's user device, with the customized display on the recipient's user device showing the venue and the sender's location, allows the recipient to find the sender more quickly than conventional voice-based or otherwise subjective descriptions.

Further aspects of the present disclosure relate to methods of routing location-based messages from the sender's user device to the appropriate recipient's user device, routing messages from the recipient's user device back to the sender's user device, etc. In some embodiments, messages may be sent directly from one user device to another user device. For example, an application may configure a sender user device to identify nearby devices as potential recipient user devices, such as devices also executing the application. The user—or the application—may select a particular user device as the recipient user device, such as a user device that is being used by service personnel. When the user wishes to send a location-based message, the application may cause the sender's user device to establish a connection with the nearby recipient's user device, and send the location-based message for receipt and processing by the recipient's user device. In some embodiments, a user may generate a location-based message and initiate sending the message to be received by the nearest user device satisfying a particular criterion, such as a user device being used by service personnel. The message may be transmitted to a transponder, and the transponder may be part of a system that is configured to route the message to the nearest criterion-satisfying user device. Alternatively, the message may be transmitted to one or more nearby user devices also executing the application, and those user devices may be configured to transfer the message to one or more other nearby user devices, until the message arrives at a user device satisfying a criterion. Such a network of connected user devices may be referred to as a mesh network.

Still further aspects of the present disclosure relate to a server—or a system of multiple servers—that manages and coordinates features of the location-based messaging system. The server can manage registration of users, assign identifiers to the users (and/or devices of users), track user's locations, etc. The server may facilitate selection of a venue, and customization of a visual map of the venue into an event-specific map. The server may communicate with the application executing on user devices and provide the event-specific map (or data from which a representation of the event-specific map can be derived) to the user devices. In some embodiments, the server may manage the routing of location-based messages between user devices, or otherwise track messages, responses, conversations, and the like.

Various aspects of the disclosure will now be described with regard to certain examples and embodiments, which are intended to illustrate but not limit the disclosure. Although aspects of some embodiments described in the disclosure will focus, for the purpose of illustration, on particular examples of user devices, location determination methods, and message transmission methods, the examples are illustrative only and are not intended to be limiting. In some embodiments, the techniques described herein may be applied to additional or alternative user devices, location determination methods, and message transmission methods. In addition, any feature, process, device, or component of any embodiment described and/or illustrated in this specification can be used by itself, or with or instead of any other feature, process, device, or component of any other embodiment described and/or illustrated in this specification.

Location-Based Messaging Environment

With reference to an illustrative embodiment, FIG. 1 shows a location-based messaging environment in which aspects of the present disclosure may be implemented. As shown, the environment includes a venue 100. Generally described, a venue 100 may be any location at which multiple users are present and may wish to communicate location-based messages with each other. Illustratively, a venue may be a stadium, arena, theater, festival grounds, park, or the like. The example venue 100 shown in FIG. 1 includes a stage 110 that may or may not be temporary. The example venue 100 also includes temporary structures, such as a lighting system 112 (e.g., mobile lighting fixture) and a shelter 114 (e.g., a tent). The example venue 100 also includes permanent structures, such as a road 116. The venue structures and other features shown in FIG. 1 are examples only, and are not intended to be limiting or exhaustive of the features that may be present in a venue.

Various users 102, 104, 106, 108 are shown present in the venue 100. Some users 102 and 104 (indicated with no label) may be attendees of an event at the venue 100. Other users 106 and 108 (indicated with a "staff" label) may be service personnel that are staffed to manage the event at the venue 100. Although only four users are shown in FIG. 1, there may be any number of users present in the venue 100. For example, there may be tens of thousands or hundreds of thousands of individual users in a venue 100 at the same time. In addition, although two different types of users are shown (attendees and service personnel), there may be any number of types of users, or all users may be of the same type.

When an attendee in the venue 100 would like to communicate with another attendee or member of service personnel, such as when the attendee requires medical or security assistance, the attendee may attempt to communicate visually (e.g., by waiving their arms), verbally (e.g., by yelling), or by seeking out a member of the service personnel. However, in a large and/or crowded venue 100, the attendee may not be able to locate a member of service personnel, or may not be seen or heard by the member of the service personnel. The attendee may instead try to contact service personnel using a user device, such as a mobile phone. However, communication via user devices may also be difficult in a crowded venue 100. When many attendees are in a venue 100 at the same time, conventional electronic communication channels and methods may be slowed, overloaded, or may fail altogether. For example, if tens of thousands of mobile phone users within a single venue 100 are connected to a public telephone network (e.g., the PSTN) via a single or small number of access points (e.g., a single or small number of nearby cellular telephone service provider towers), the users may experience delays and outages when trying to communicate. Such delays and outages may be particularly unwelcome during time of emergency, such as when a user requires urgent medical attention or security assistance.

To overcome or avoid these and other communication challenges, the attendees, service personnel, and other users in the venue 100 may use user devices with applications configured to communicate without relying on the conventional electronic communication channels discussed above. Users may use mobile phones executing an application that allows the communication of location-based messages to other users in the venue 100 without going through the public telephone network. The application may allow users to send location-based messages with automatically-determined location data to other user devices that are also executing the application. Additionally, or alternatively, the application may allow users to enter, select, or otherwise manually indicate their location on a display, and location data determined from the indicated location is then sent to other user devices also executing the application.

The application may configure the user devices to send location-based messages to nearby transponders 120. Individual transponders 120 may forward location-based messages to the nearest user device that satisfies one or more criteria, such as the nearest user device that is used by a member of the service personnel. Additionally, or alternatively, individual transponders 120 may forward location-based messages to other transponders 120 until one or more transponders 120 are able to send the location-based message to one or more appropriate user devices. Transmission of location-based messages via one or more transponders 120 is discussed in greater detail below with respect to FIG. 6A. In some embodiments, a user device may send the location-based message to one or more nearby user devices that are also executing the application, those user devices may forward the message to other user devices that are also executing the application, and so on, until the location-based message is received by a user device satisfying one or more criteria. Transmission of location-based messages via one or more other user devices is discussed in greater detail below with respect to FIG. 6B. In some embodiments, the applications may configure the user devices to send location-based messages directly to other user devices nearby. For example, a user device may identify a particular user device nearby that satisfies one or more criteria, and the user device may send a location-based message to that user device.

The individual user devices may be any of a wide variety of electronic communication devices, including mobile phones, tablet computing devices, media players, handheld gaming devices, wearable electronic devices configured with application execution capabilities (e.g., "smart watches" or "smart eyewear"), and various other electronic communication devices.

Example Location-Based Messaging Interfaces

Figure 2:
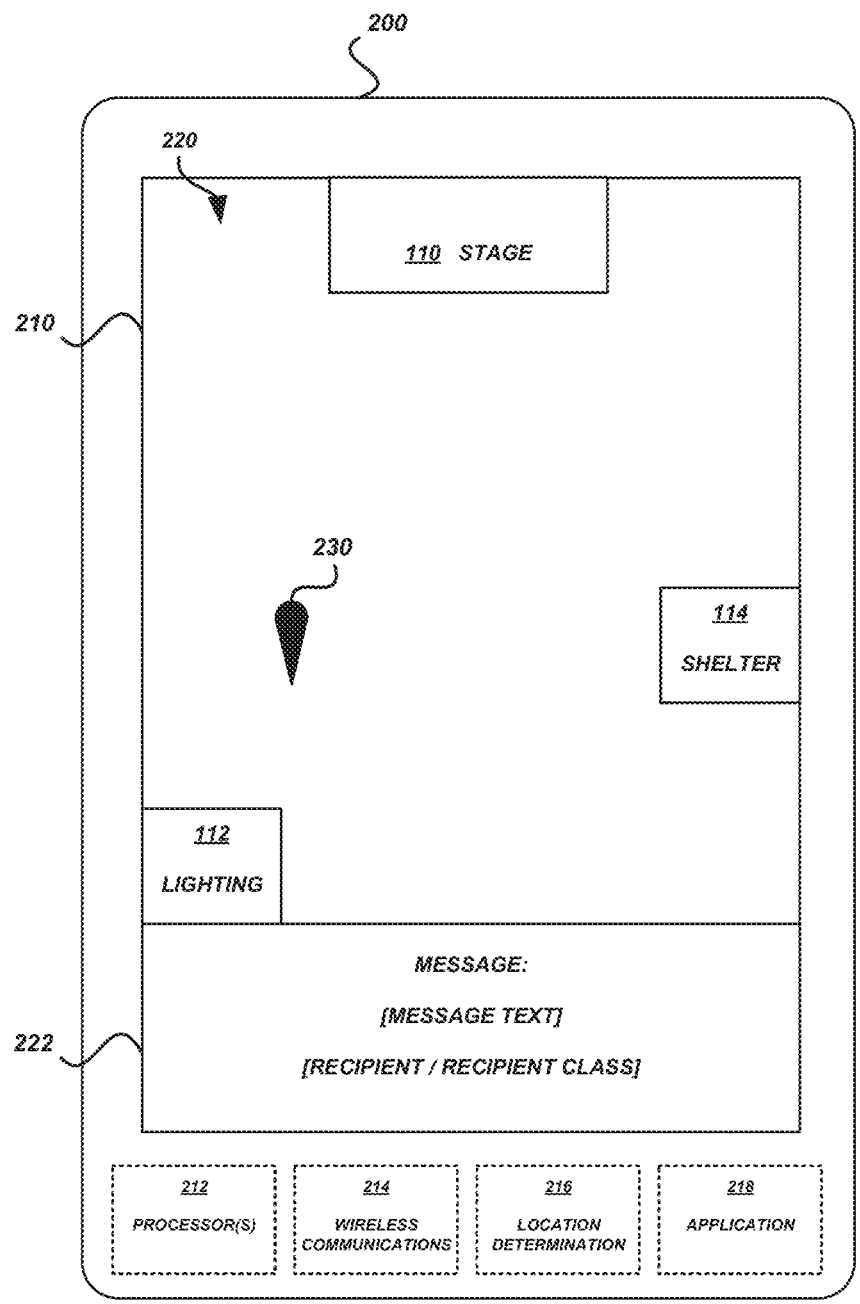
FIG. 2 is a user interface diagram of an illustrative interface for selecting a location and generating a location-based message according to some embodiments.

FIG. 2 shows an example user device 200 that may be used to generate and communicate location-based messages according to some embodiments. The user device 200 may also be referred to as a sender device 200 to distinguish it from other user devices that receive location-based messages generated by the sender device 200. As shown, the sender device 200 is a mobile phone that includes various components. For example, the sender device 200 may include a display component 210 such as display screen. The display component 210 may be a combination input/output component, such as a touch screen. The sender device 200 may also include one or more processors 212 such as central processing units, graphics processing units, and the like. The sender device 200 may also include one or more wireless communication components 214 such as cellular antennas, Wi-Fi antennas, Bluetooth antennas, and the like. The sender device 200 may also include one or more location determination components 216 such as global positioning system ("GPS") antennas and related circuitry. The sender device 200 may also include a location-based message application 218 to provide various location-based messaging features. The application 218 may be a software component comprising executable instructions stored in a persistent data store, such as a flash memory, then loaded into volatile memory, such as random access memory ("RAM") and executed by the one or more processors 212. In some embodiments, the application 218 may be or include application-specific hardware instead of, or in addition to, a software component. The example components of the sender device 200 shown in FIG. 2 and described herein are illustrative only, and are not intended to be limiting or exhaustive of the components that may be present in sender device 200 or otherwise used to provide the features of the present disclosure.

A user may use the sender device 200 to generate and send a location-based message to one or more other user devices, also referred to as recipient devices. The user may access the application 218 to generate the location-based message, or the features of the application 218 may be integrated into the sender device 200 such that the user does not need to separately access the application 218 to generate a location-based message.

The application 218 may cause the sender device 200 to display a map 220 of the venue 100 on the display component 210. The map 220 may be a graphical representation of the venue 100, such as a satellite image (e.g., if the venue is an outdoor venue), a composite image (e.g., a composite of images taken by drones or taken by cameras above the venue floor), a drawing, or the like.

In some embodiments, the map 220 may be generated specifically for the configuration of the venue 100 for a particular event, rather than a generic map 220 that includes only the boundary and permanent structures of the venue 100. For example, as shown in FIG. 1, the example venue 100 is bounded by a permanent road 116. The example venue 100 is configured for an example event with the addition of a stage 110, a lighting system 112, and a shelter 114. These structures may be temporary structures that are in place for one event or otherwise for a limited time. Prior to the event, a user (e.g., a system administrator) may generate an event-specific or otherwise updated map 220 for the venue 100. Illustratively, the user may generate the map 220 by adding to the map 220 a representation of the temporary structures, or by obtaining updated images with the temporary structures. In this way, an event-specific map 220 may be made available to attendees, service personnel, and other users. Such an event-specific map 220 can provide users with the ability to more accurately determine their own location and/or the location of other users with respect to the event-specific configuration of the venue 100 that would otherwise be possible with a generic map of the venue 100.

The application 218 may receive data to display the map 220, such as upon registering for an event, upon accessing the application 218 from within the venue 100, etc. In some embodiments, the map 220 may be an integrated part of the application 218, such as if the application 218 is obtained upon registering for the event, upon entering the venue 100 at the time of the event, etc.

The application 218 may also cause the sender device 200 to display a message entry portion 222. The message entry portion 222 may allow a user to provide a message that is to be sent with, or separately from, location data. The message entry portion 222 may be used to enter a textual message, such as a message that is typed from a user via a "soft" or "hard" keyboard, a transcription of a user utterance generated by an automatic speech recognition component, a pre-generated message selected by the user, etc.

In some embodiments, the message entry portion 222 may also provide for entry of—or otherwise facilitate selection of—a recipient or recipient class for the message. A recipient class may be a subset of users of the location-based messaging system, such as EMT personnel, security staff, or the like. The message may be directed to the recipient class as a whole to be acted upon by at least one member of the recipient class. For example, the message may be received and displayed by a physically or logically nearest member of the recipient class, where "physically nearest" refers to the member of the recipient class in closest geographic proximity to the sender device 200, and where "logically nearest" refers to the member of the recipient class in closest network proximity with the fewest number of intermediary communication links, such as other user devices and/or transponders, between the sender device 200 and the member of the recipient class. As another example, the message may be directed to whichever member of the recipient class receives the message first, without regard to physical or logical distance.

To send the message to a recipient class, the message entry portion 222 or some other user interface element may provide a plurality of selectable objects, with individual selectable objects corresponding to individual recipient classes or other groups of recipients (e.g., multiple recipient classes). Selection of one or more objects may cause the application 218 to transmit the message to one or more recipients in the recipient class directly, or indirectly via one or more intermediary devices. In some embodiments, the application 218 may be configured to direct the message to a recipient class without selection of the recipient class by the user. For example, the application 218 may, by default (e.g., in the absence of a different selection) or exclusively (e.g., without allowing for a different selection), direct messages from attendees or other users to event support staff at the venue.

In one specific, non-limiting example, an attendee such as user 102 in FIG. 1 may wish to send a message to service personnel within the venue 100. The message may relate to an emergency, such as a medical issue that the user 102 or a nearby attendee is experiencing. The user 102 may access the application 218 on the sender device 200, and initiate a message using the message entry portion 222. In order to provide service personnel with an accurate location of the user 102 within the venue 100, the user 102 may indicate the user's current location by interacting with the map 220. For example, the user 102 may tap, drag, or otherwise touch the display component 210 at location of the map 220 that corresponds to the user's physical location within the venue 100. A display object 230, such as a pin, flag, or star, may be displayed on the map 220 at the selected location. In some embodiments, the display object 230 may be initially determined by the application 218 using estimated location data from the location determination component 216. The user 102 may then confirm the initially-determined location or indicate the user's actual location by adjusting the location of the display object 230.

The application 218 may determine objective location information using the location of the display object 230 on the map 220. For example, the application 218 may use a coordinate system associated with the map 220 to determine the coordinates of the display object 230. Such objective location information may be sent in a location-based message to a recipient device. The recipient device may execute the application and use the objective location information to display the sender's location on the map. In some embodiments, objective location information may be automatically determined by the application 218 using data from the location determination component 216 independently of the location of the display object 230 on the map 220. For example, if the display object 230 is presented on the map 220 based on location data from the location determination component 216 and is not modified by the user, then the location data from the display determination comment 216—or data derived therefrom—may be used as object location information.

The objective location information may be sent with, or separate from, a message that the user generates using message entry portion 222. For example, the application 218 may generate a message container that includes the objective location information and the message. The message container may be the data structure that is sent to another user device. As another example, the application 218 may generate and send two separate data structures: one that includes the message provided using message entry portion 222, and one that includes the objective location data.

Figure 3:
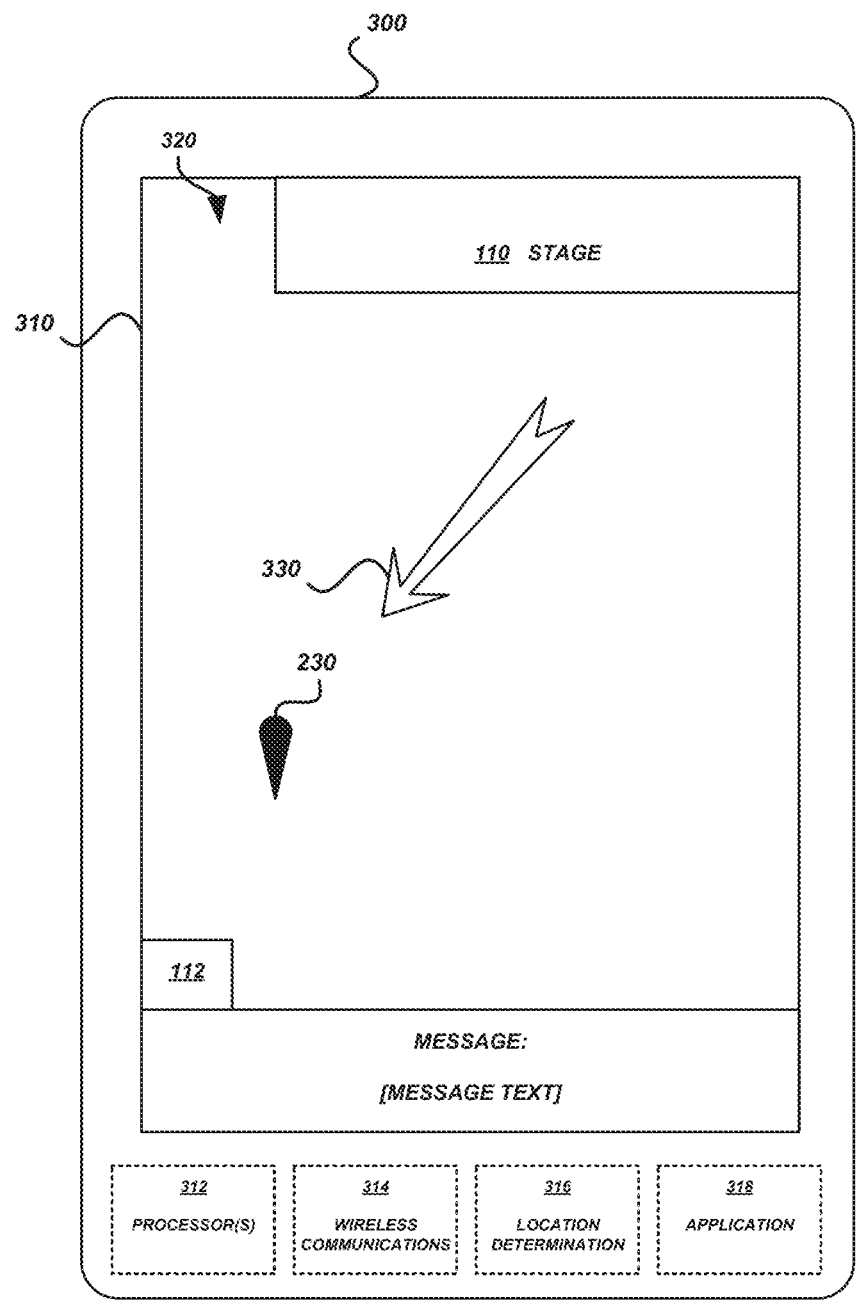
FIGS. 3 and 4 are user interface diagrams of illustrative user interfaces for displaying a location-based message and the location of a user device according to some embodiments.

FIG. 3 shows an example user device 300 that may be used to receive, process, and display location-based messages according to some embodiments. The user device 300 may also be referred to as a recipient device 300 to distinguish it from other user devices that send location-based messages received by the recipient device 300. Illustratively, the recipient device 300 may be identical to, substantially the same as, or different than the sender device 200 described above. For example, the recipient device 300 may be a mobile phone that includes various components, such as a display component 310, one or more processors 312, one or more wireless communication components 314, one or more location determination components 316, and an instance of the location-based messaging application 318 to provide various location-based messaging features. The application 318 may be the same as the application 218 on the sender device 200, or it may be a different application or application version with different features, such as features designed for use by service personnel rather than—or in addition to—the features used by event attendees.

The recipient device 300 may receive a location-based message from a sender device 200. The location-based message may be received directly from the sender device 200, indirectly via one or more other user devices, or indirectly via one or more transponders 120, as discussed in greater detail below. The location-based message may include objective location data and a message (e.g., a textual message) from the sender, or the location-based message may be received independently from any textual message data, as discussed in greater detail below.

The application 318 of the recipient device 300 may cause presentation of a locator interface 320 on the display component 310. The locator interface 320 may include a representation of a map of the venue 100, such as the map 220 that was displayed by the sender device 200. For example, the application 318 may obtain the map 220 upon registration of the application 318 and/or device 300 by a user, such as service personnel 106, or upon entry at the venue 100. As another example, the application 318 may be obtained by recipient device 300, and may include the map 220 integrated within the application 318.

The locator interface 320 may include a dynamic direction indicator 330, such as an arrow, pointer, or representation of a compass needle. The dynamic direction indicator 330 may visually indicate the direction, with respect to the recipient device 300, of the sender device 200 within the venue 100. For example, assuming the stage 110 shown in FIG. 1 is located on the north side of the venue 100, then attendee 102 is located southwest of service personnel 106. The dynamic direction indicator 330 may point in the direction of the location of the sender device 200 used by the attendee 102. In this example, the sender device 200 is southwest from the recipient device 300 being used by service personnel 106. The dynamic direction indicator 330 may be dynamic in the sense that it dynamically changes the direction at which it points based on the current orientation of the sender device 300 and changes to the orientation of the sender device 300.

Figure 4:
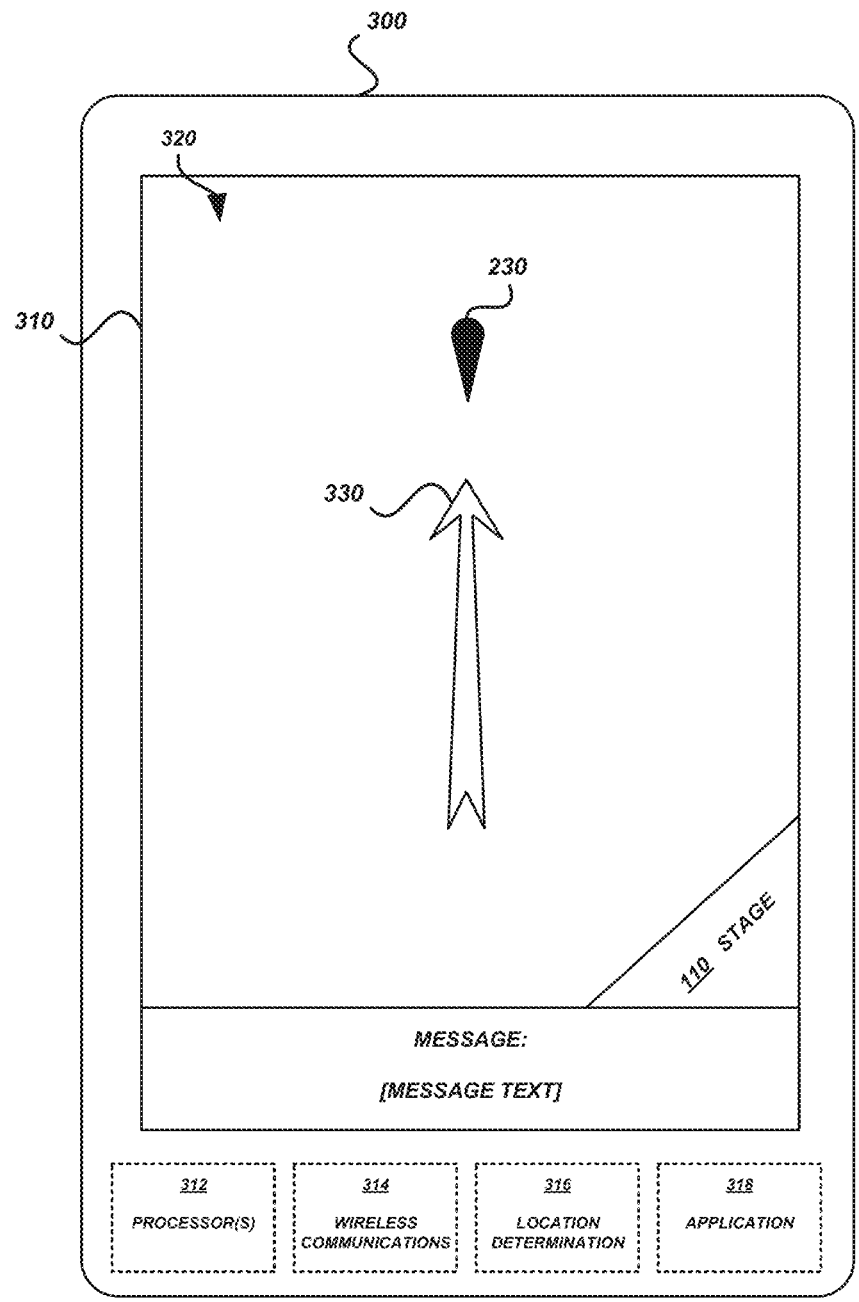

FIG. 4 shows an example of the locator interface 320 displayed on the display component 310 after the recipient device 300 is rotated toward the sender device 200, assuming the service personnel 106 is holding the recipient device 300 such that the top of the device 300 is pointed in the direction that the service personnel 106 is facing as the user changes position toward the sender device 200. As shown, the representation of the stage 110 has moved to the lower right corner of the display component 310, indicating that the recipient device 300 is facing in a southwest direction from the stage 110. The dynamic direction indicator 330 now points toward the top of the display component 310, but still in the direction of the sender device 200, and therefore in the direction of the attendee 102. The change in orientation of the recipient device 300 may be determined based on a location determination component 316, such as an internal magnetometer, a gyroscope, or some other sensor. Based on data generated by the location determination component 316, the application 318 can determine whether the orientation of the recipient device 300 has changed, the degree to which the orientation of the recipient device 300 has changed, the current orientation of the recipient device 300 with respect a magnetic pole of the earth, etc.

In some embodiments, the application 318 may cause the locator interface 320 to display directions from the current location of the recipient device to the location of the sender device 200, and/or progress of the recipient device 300 toward the location of the sender device 200. The direction and/or progress may be display instead of, or in addition to, a dynamic direction indicator 330. For example, the locator interface 320 may include a display object (not shown) that indicates the current location of the recipient device 300 (e.g., as determined by a location determination component 316). The locator interface 320 may display directions to the location of the sender device 200, such as a line that connects two display objects, a series of textual or pictorial directions, etc. The locator interface 320 may dynamically adjust the position of the display object representing the recipient device 300 on the map to indicate progress toward the location of sender device 200, as the location of the sender device 200 is determined based on the location-based message received from the sender device 200.

Example Location-Based Message Processing

Figure 5:
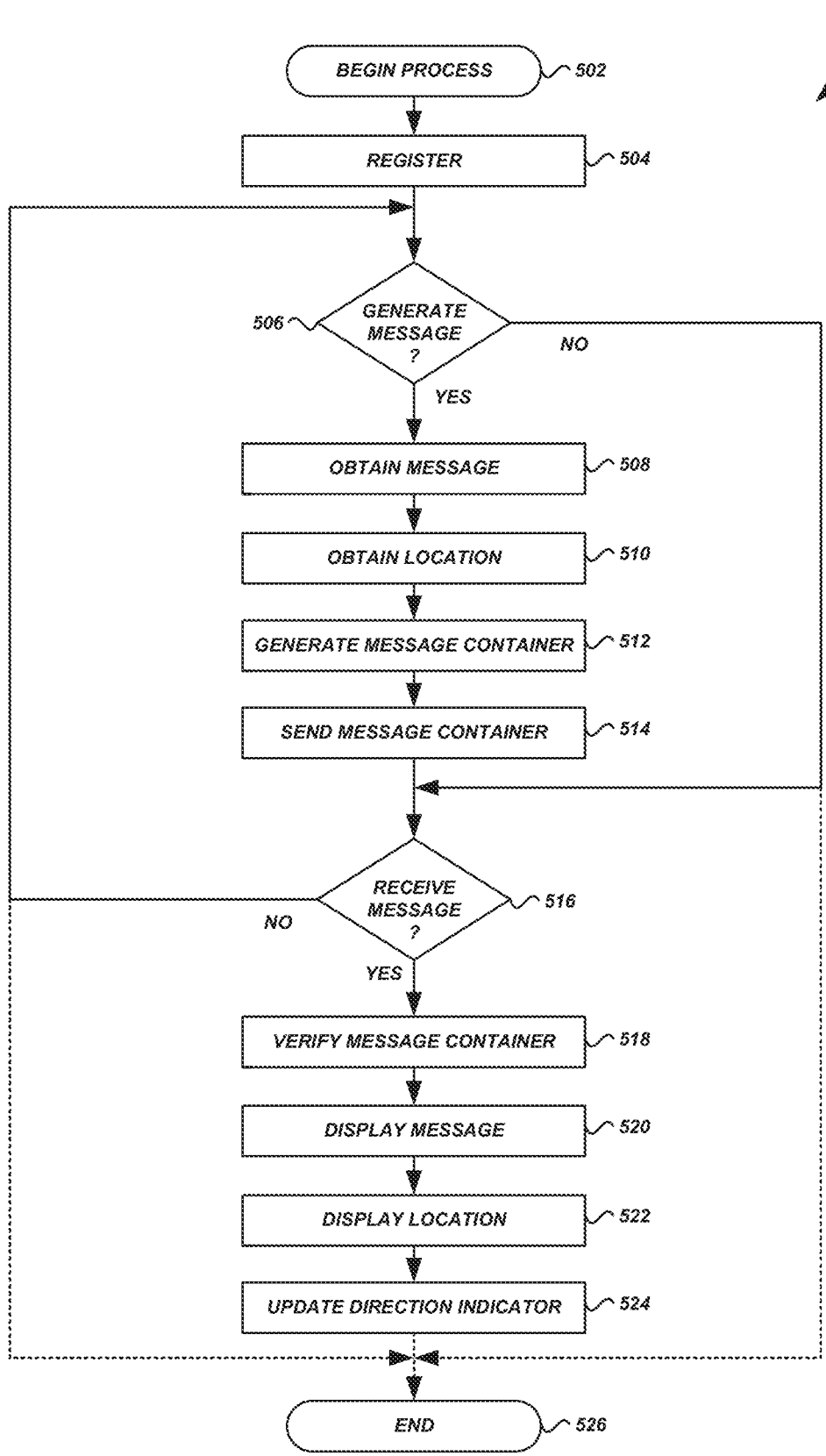
FIG. 5 is a flow diagram of an illustrative process for generating and processing location-based messages according to some embodiments.

FIG. 5 is a flow diagram of an illustrative process 500 that may be executed by a user device to generate, send, and/or receive location-based communications. Advantageously, the process 500 may be performed by or at the direction of a location-based messaging application that is installed on a user device. Portions of the process 500 will be described with reference to the illustrative data flows and interactions shown in FIGS. 6A and 6B.

The process 500 shown in FIG. 5 begins at block 502. The process 500 may begin in response to an event, such as when a user device begins operation, when a user device begins execution of the location-based message application, or in response to some other event. When the process 500 is initiated, a set of executable program instructions stored on one or more non-transitory computer-readable media (e.g., hard drive, flash memory, removable media, etc.) may be loaded into memory (e.g., random access memory or "RAM") of a user device. The executable instructions may then be executed by a hardware-based computer processor (e.g., a central processing unit or "CPU") of the user device. In some embodiments, the process 500 or portions thereof may be implemented on multiple processors, serially or in parallel.

At block 504, the location-based messaging application or some other component of a user device may perform a registration operation. Registration may include registering a user of the application, registering the user device executing the application, and/or registering the application itself. A user may register by providing identifying and/or contact information, such as a name, email address, phone number, staff identification number, etc. The user may agree to provide access to location services of the user device, such as access to GPS information or other location determination components and/or information. The user may register as a particular type of user, such as an event attendee, a member of service personnel for an event or venue, etc. Registration may include providing identifying information of the application and/or device, such as a license number, a serial number, a media access control address ("MAC address"), some other identifying information, some combination thereof, etc. Registration information may be stored locally on the user device in a location accessible to the application. In some embodiments, registration information may be provided to another device via a network, such as to a server system that manages location-based messaging, or to a network of transponders in a venue.

In one specific, non-limiting embodiment, registration of a user comprises generating or otherwise obtaining a user identifier for the user that is unique, such as a universally unique identifier ("UUID"), or user identifier that is at least unique for practical purposes, such as a license number, randomly-generated number, etc. The application on the user device may assign the user identifier, or may receive a user identifier assigned by a server. For example, the application or server may assign a random user ID or a next available user ID from a sequence or pool. As another example, if the user is a member of a particular user group, such as emergency personnel, the user may have a user profile assigned to the particular group. Illustratively, the user profile may include information provided by a manager, supervisor, or the like. The identifier for a particular user can include a group portion, such as portion representing a type of company or department name. The identifier may also include a unique identifier portion, such as a UUID, employee identifier, license number, etc. Thus, a particular identifier for an EMT may be formed as "E-[registration number]," and a particular identifier for a member of security staff may be formed as "S-[registration number]."

At decision block 506, the application or some other component of the user device may determine whether a location-based message is to be generated. For example, a user may access the application and begin entry of message information into the user interface. If a message is to be generated, the process 500 may proceed to block 508. Otherwise, if no message is to be generated, the process 500 may proceed to decision block 516, or the process 500 may end.

At block 508, the application or some other component of the user device may obtain a message to be sent to another user device. The message may be a voice message, an image message, a video message, a text message, some combination thereof, or the like. For example, as described in greater detail above, a sender device 200 may present an interface that includes a message entry portion for receiving a message. The application may store the message, or data from which the message can be derived (e.g., an encrypted version of the message, a pointer to the message, etc.). In some embodiments, the sender device 200 interface may also facilitate selection or entry of a recipient or recipient class for the message. A recipient class may be a subset of users of the location-based messaging system, such as EMT personnel, security staff, or the like. The message may be directed to the recipient class as a whole to be acted upon by at least one member of the recipient class. Based on user input, the application may determine an identifier of the recipient or recipient class.

At block 510, the application or some other component of the user device may obtain location information to be sent to another user device. The location information may be provided by a user, automatically determined by the application or a component of the user device, or some combination thereof. For example, as described in greater detail above, a sender device 200 may present an interface that includes a map of the venue, and a user may indicate where on the map the user is located. In some embodiments, the map may include an automatically-determined initial location indicator that may be accepted or modified by the user.

At block 512, the application or some other component of the user device may generate a message container using the message data and location data obtained above. The message container may be a data structure configured to store message and location data such that the data can be accessed by another user device after transmission of the message container. In addition, the message container may include an identifier of the sender, such as a unique identifier that is generated or provided upon registration. The message container may also or alternatively include an identifier of the message itself, such as a serial number or other unique identifier that can be used by the sender and/or recipient to track the message and subsequent related messages (e.g., a multi-turn conversation). In some embodiments, the message container may be generated in the form of one or more structured files, such as Extensible Markup Language ("XML") files or JavaScript Object Notation ("JSON") files. In some embodiments, rather than generate and transmit a file, the application may use an application programming interface ("API") provided by, or otherwise configured to interface with, other user devices executing the application or other intermediaries such as transponders. The application may then make a programmatic call or other transmission in which the location-based message information is provided to the other device(s) in accordance with the API.

In one specific non-limiting embodiment, the message container may include the following elements: time stamp data representing a time associated with the message, such as when the location-based message is initiated, completed, or sent; sender identifier data representing an identifier of the sender, such as the UUID registered to the user logged into application; message data representing the message text/audio/images/etc.; location data representing the location of the user (or user device) with respect to the event-specific map or otherwise within venue; recipient identifier data representing an identifier of a recipient or recipient class; or some combination thereof.

In some embodiments, users will have the option to disable sharing of their current location. In some embodiments, the location of a user is only determinable or able to be provided in a message while the user is logged into the connected application and has the location-sharing capability enabled.

At block 514, the application or some other component of the user device may send the location-based message (e.g., by transmitting the message container). The application may cause the user device to send the location-based message to one or more user devices that satisfy one or more criteria. For example, the application may access data regarding nearby user devices. The data may be obtained from the nearby devices themselves, or from some intermediary or 3rd party device, such as a server or transponder. Illustratively, the application may select the nearest device that is registered as being used by a member of the service personnel. As another example, the application may transmit the message to a nearby device and/or 3rd party device such as a server, and the message container may be forwarded to a recipient device directly or via other intermediary devices.

Figure 6A:
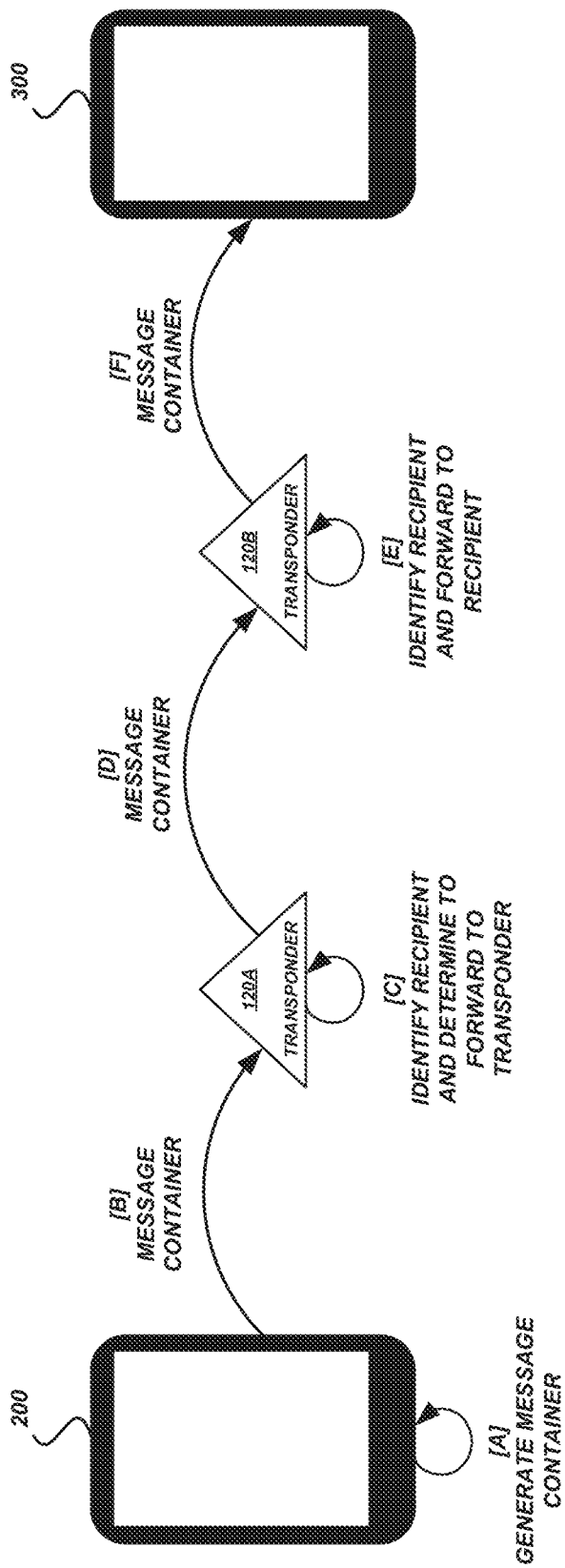
FIGS. 6A and 6B are block diagrams illustrating interactions between various devices during the transmission of a location-based message according to some embodiments.

FIG. 6A illustrates an example in which a sender device 200 sends a location-based message to a recipient device 300 via one or more transponders 120 or other intermediary devices. Transponders 120 may be set up in various locations of a venue where an event is held to support virtual channels of communication between devices configured with an authorized application. Some transponders 120 may be specifically placed in emergency areas and/or near significant structures or other focal points of events (e.g., stages) to best facilitate the delivery of the messages sent through the location-based messaging system. For example, the intended recipient of an initial message sent by a user may be a member of EMT personnel or security staff, and therefore transponders may be positioned to effectively relay messages between such users and recipients. In some embodiments, the transponders 120 can be easily broken down and placed in different areas during the time frame of an event.

As events may be busy and have a lot of traffic, in some embodiments the transponders 120 may connect to each other via communication channels dedicated to the location-based messaging system. Devices connected through the authorized application may send their messages and location information through these dedicated channels. In some embodiments, transmissions via the channels may be correlated to information regarding the event-specific map (e.g., locations of structures, transponders, etc.) such that users can identify where they are within the venue as shown on the event-specific map presented via the user device interface. When this location data is presented within the application's interface, the recipient following the location destination will be able to see an overview of a virtual path through the venue to the sender. The application will be able to indicate if the recipient is going off track with a dynamic direction indicator, as described in greater detail above.

As shown, the sender device 200 generates a message container at [A], and sends the message container a nearest transponder 120A at [B]. The transponder 120A determines a proper recipient of the message at [C]. For example, the transponder 120A determines a recipient to which the message container is addressed (e.g., a specific recipient device), or a group of potential recipients to which a nearest member is to receive the message container (e.g., a recipient class, such as members of service personnel). If there is no appropriate recipient nearby, the transponder 120A may forward the message container to one or more other transponders at [D] (or one or more user devices that may serve as relaying intermediaries). Another transponder 120B (or user device) may receive the message container, and perform the same or a similar procedure at [E] as the transponder 120A performed at [C]. In the example shown, an appropriate recipient device 300 may be nearby, such as a recipient device 300 registered to a member of the recipient class to which the message is directed, or the recipient device 300 registered to the specific recipient to which the message is directed. The transponder 120B may forward the message container to the recipient device 300 at [F].

Figure 6B:
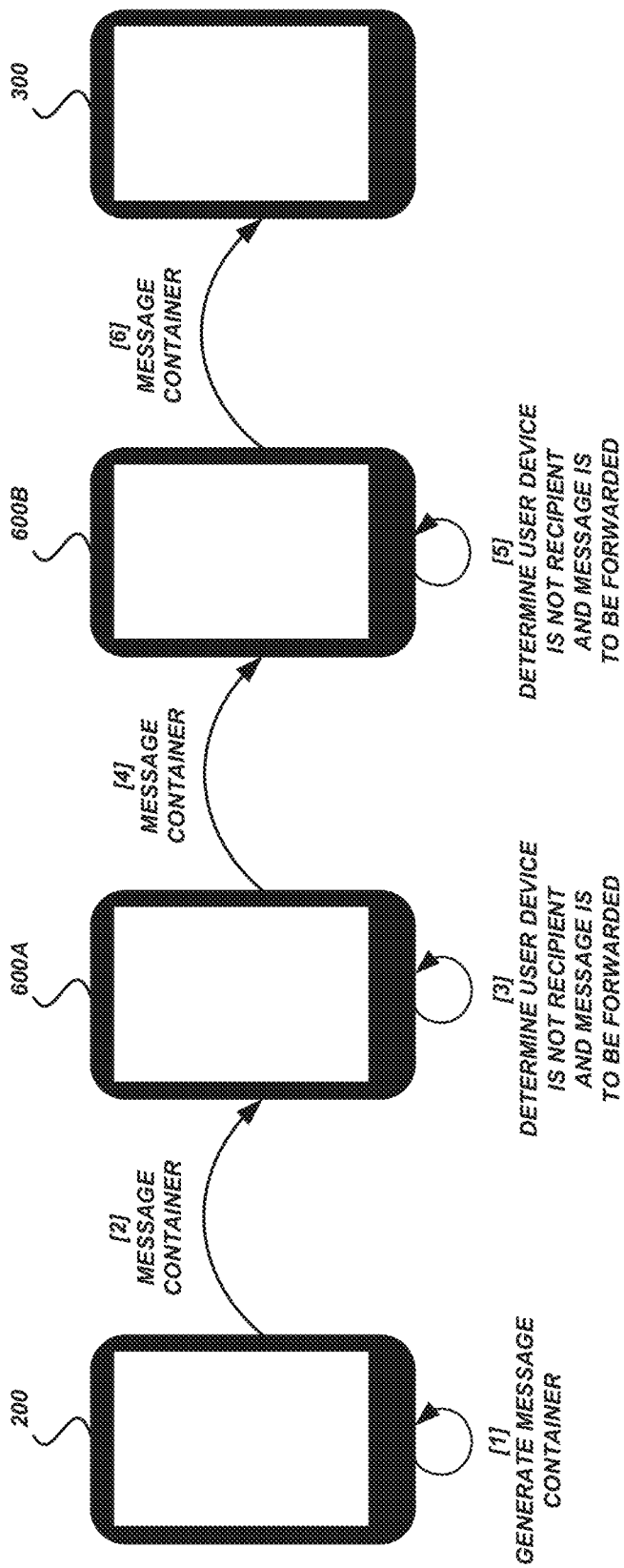

FIG. 6B illustrates an example in which a sender device 200 sends a location-based message to a recipient device 300 via one or more intermediary user devices. As shown, the sender device 200 generates a message container at [1], and sends the first message container to a nearest user device 600A at [2]. The user device 600A may be any nearby user device that also includes the application and is thus configured to determine whether the user device 600A is an appropriate recipient (e.g., the recipient to which the message is directed, or a member of the recipient class to which the first message container is directed), or whether the user device 600A is to forward the first message container to one or more other nearby user devices until the first message container arrives at one or more appropriate recipient devices. The user device 600A may make the determination at [3] to forward the first message container onto one or more other user devices, and may proceed to forward the first message container at [4]. Another user device 600B may receive the first message container, and perform the same or a similar procedure at [5] as the user device 600A performed at [3]. In the example shown, an appropriate recipient device 300 may be nearby, and the user device 600B may forward the first message container to the recipient device 300 at [6]. To provide security, the users of the intermediate user devices 600A and 600B may not be able to access the message data and/or location information in the first message container—rather, the application executing on the user devices may relay the first message container, preventing access to that information unless the user device is an appropriate recipient. In some embodiments, the application executing on device that is forwarding the message may relay the message in the background to another user device or intermediary device, without any notification to the user of the forwarding device that the message was received and relayed by the forwarding device.

The example communications between multiple user devices and/or other intermediary devices may be implemented using mesh networking. Illustratively, the user devices may communicate with each other and/or with other devices, such as transponders or servers, using various wireless protocols, such as Bluetooth, Bluetooth Low Energy ("BLE"), Zigbee, Wi-Fi, etc.

In some embodiments, messages are communicated wirelessly (e.g., using BLE) via a channel that can only be created in between user devices with an authorized application (such as application 218 and/or application 318). The application can also engage with networking routers such as TP links, repeaters or extenders within a venue. A wireless communication channel between two user devices—or a different wireless channel—may also be established to a server. The user devices will be able to detect and recognize other user devices within the venue as long as their applications are in communication with each other and/or to the server.

In some embodiments, when a message is ready to be sent and the user submits the message, the application (e.g., application 218) generates the first message container as described in greater detail above. The first message container may include or be associated with a tag that can be read by user devices that have an authorized application (such as application 218 and/or application 318), transponders, servers, and other components of the location-based messaging system. The tag allows recipients to validate the tag for a specific communication channel. For example, the tag may include channel data assigning the tag to the specific communication channel. A server, transponder, or other intermediary device that communicates with user devices having authorized applications can also inspect the tags and identify peer devices to ensure they are received by the correct party and transmitted through only user devices having an authorized application. In some embodiments, the tag or associated message container may time out or expire after a threshold period of time has passed without being received and processed by an appropriate recipient.

In some embodiments, a tag can be used to tie a message container to a particular channel and to ensure that the message container is traveling specifically on the channel flow created by a wireless mesh network. This may provide a personalized channel such that the tag can be identified by user devices that have the authorized application, and without interference from other channels or other devices that don't have the authorized application. If a user device has an application that communicates only with a server, this may reduce possible network traffic issues.

Recipients of message containers may also send replies to the senders. A reply message container may be associated with the same tag or a tag derived from the received tag or message container. The reply may be sent via a communicative channel that is not necessarily the same as the received message. The received message container—or the associated tag—may be augmented with data regarding the direction or intermediary devices via which the message was sent. Replies may thus be sent via the same channel. In some embodiments, the reply message may be sent via a different channel. For example, the applications, transponders, server, or some combination thereof may monitor existing channel flows between devices. The application may then use the strongest/shortest/fastest channel available in order to send the message container quickly.

Returning to FIG. 5, at decision block 516 the application or some other component of the user device may determine whether a location-based message has been received. If a message has been received, the process 500 may proceed to block 518. Otherwise, if no location-based message has been received, the process 500 may return to block 506, or the process 500 may end.

At block 518, the application or some other component of the user device may verify the location-based message. Verification may include confirming that the message container is in a proper format, that the message container is from a valid sender, etc. The application may also or alternatively determine whether the user device is the intended recipient of the location-based message, or otherwise whether the user device is an appropriate recipient. In some embodiments, the application may determine whether the user device satisfies one or more criteria associated with the location-based message, such as whether the user device is registered to a member of service personnel and the location-based message is intended for a member of the service personnel. For example, the message container may be directed to the EMT group or the security staff in general. If the user device (or the application executing thereon) is registered to a user with a corresponding identifier, such as "E-[registration number]" for EMTs or "S-[registration number]" for security staff, respectively, then the application may verify that the user device is an appropriate recipient. As another example, if the message is addressed to a particular user (e.g., as part of an ongoing conversation), the application can determine whether a recipient identifier in the message container matches a corresponding identifier of the registered user of the user device. If the user device satisfies the criteria, then the process 500 may proceed with processing of the message for display. Otherwise, the criterion may not be satisfied and the location-based message may be relayed on to another device, rejected (e.g., by return message to sender), or dropped (e.g., not acted upon and not relayed or responded to by return message).

In some embodiments, verification may include verifying the location data in the message container. The application of the recipient device may verify the current location of the sender device by communicating with one or more devices, such as: a server that maintains connection with user devices or is able to establish connections periodically or on demand; a transponder that is in communication with user devices or is able to obtain location data from or otherwise regarding user device; or other user devices, such as relaying user devices or the sender device itself.

At block 520, the application or some other component of the user device may display the message included in the message container, if any. For example, if the message container includes textual content, video content, image content, and/or audio content, the application may cause the user device to present the contents of the message.

At block 522, the application or some other component of the user device may display the location of the sender device. For example, as described in greater detail above, the application may present a locator interface on which the location of the sender device—as indicated by location information included in the location-based message—may be displayed.

At block 524, the application or some other component of the user device may update display the location of the sender device with respect to a changed location of the user device. For example, as described in greater detail above, the application may present a dynamic direction indicator that is dynamically updated to reflect changes in location, direction, and/or orientation of the user device with respect to the location of the sender device.

In some embodiments, the application may update display of the location of the sender device by obtaining updated location information reflecting a changed location of the sender device. Illustratively, when an intermediary device is being used (such as a server that manages aspects of the location-based messaging system, a transponder that relays messages, or another user device that relays messages), the intermediary device may maintain a connection with the sender device or otherwise be able to obtain—periodically or on demand—updated location data representing the current location of the sender device. Alternatively, the sender device itself may proactively provide updated location data, or may be accessible to the recipient device over an established connection or a connection able to be established periodically or on demand. The sender device may provide the recipient device— directly or via an intermediary device—updated location data regarding the location of the sender device. Updated location data may take the same form as location data originally included in the message container, such as GPS coordinates or coordinates on an event-specific map or otherwise resolvable to a location within the venue. In such embodiments, the location of the sender device will remain accessible as long as the sender device is within the venue or otherwise able to communicate with the intermediary device or recipient device. The recipient device would therefore be able to present any movement of the sender device by updating the display object representing the sender device.

The process 500 may return to decision block 506 and/or decision block 516, or the process 500 may terminate at block 526.

In some embodiments, a user may send an initial message that does not include location information. For example, a user may send a message requesting assistance, and the message may be transmitted to a nearby member of service personnel, as described above. Once a member of service personnel receives the message, the member may respond with a request for location information. The request may be sent back to the sender device in substantially a reverse sequence from that described above with respect to the initial message from the sender device to the member of service personnel. The attendee using the sender device may view the response from the member of service personnel and provide the requested location information as described in greater detail above, respond with a follow-up message that may or may not include location information, or send no message in response.

In some embodiments, a conversation of three or more user devices may be created. For example, a sender device may send a message that is received by multiple recipient devices, each of which may or may not send responses to the sender device and/or other recipient devices. As another example, the sender and/or a recipient may add a user device to the conversation (e.g., by sending another message).

Example Server Computing System

Figure 7:
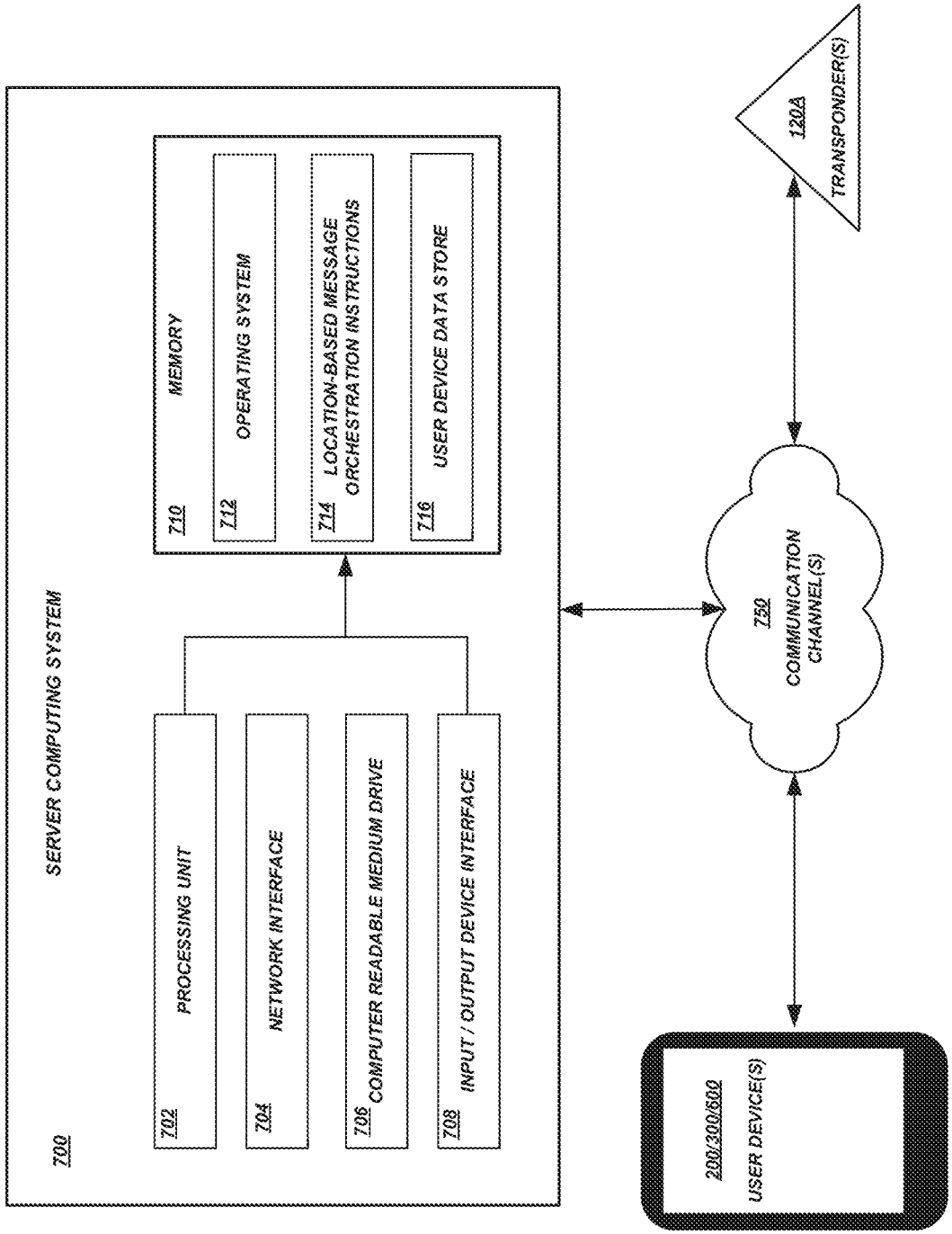
FIG. 7 is a flow diagram of an illustrative server computing system that implements features of a location-based messaging system according to some embodiments.

FIG. 7 shows components of a server computing system 700 that may be used to implement features of the location-based messaging system, such as the features described herein as being provided by a server or other intermediary system. In some embodiments, as shown, the server computing system 700 may include: one or more computer processors 702, such as physical central processing units ("CPUs"); one or more network interfaces 704, such as a network interface cards ("NICs"), wireless communication antenna and related circuitry, etc.; one or more computer readable medium drives 706, such as a high density disk ("HDDs"), solid state drives ("SDDs"), flash drives, and/or other persistent non-transitory computer-readable media; one or more input/output device interfaces 708, and one or more computer readable memories 710, such as random access memory ("RAM") and/or other volatile non-transitory computer-readable media. The computer readable memory 710 may include data storage and/or computer program instructions that the computer processor(s) 702 execute in order to implement one or more embodiments. For example, the computer readable memory 710 can store an operating system 712 that provides computer program instructions for use by the computer processor 702 in the general administration and operation of the server computing system 700. The computer readable memory 710 may also include location-based message orchestration instructions 714 for implementing features of one or more components of the location-based messaging system, such as the registration of users, the setup of maps, the relaying of messages, and the tracking and verification of user device locations. The computer readable memory 710 may also include user device data storage 716 for storing data regarding registered users, venue maps, messages, and the like.

The server computing system 700 may communicate with user devices 200/300/600 and/or transponders 120 via one or more communication channels 750, such as BLE networks, mesh networks, and the like.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
as implemented by a user device comprising one or more computer processors configured to execute specific instructions,
generating location data representing a location of the user device within a venue;
generating recipient identifier data representing an identifier of a recipient class to which a message is directed, wherein the recipient class comprises a plurality of recipient devices located within the venue;
generating a first message container comprising the location data and the recipient identifier data;
sending the first message container to a second user device, wherein the second user device is configured to determine whether to:
[i] relay the first message container from the user device to a recipient device based on the second user device not being in the recipient class, or
[ii] present the message from the first message container based on the second user device being in the recipient class;
receiving a second message container, wherein the second message container is directed to the recipient class; and
augmenting the second message container with data regarding the user device such that a reply to the second message container may be relayed via the user device.

2. The computer-implemented method of claim 1, further comprising:
generating time stamp data representing a time associated with generation of the first message container; and
including the time stamp data in the first message container, wherein the first message container expires a threshold period of time after the time represented by the time stamp data.

3. The computer-implemented method of claim 1, further comprising:
determining the location of the user device within the venue based at least partly on output of a location determination component of the user device; and
presenting a user-movable display object on a map representing the location of the user device.

4. The computer-implemented method of claim 1, further comprising determining, in response to receiving the second message container, to forward the second message container to a third user device based at least partly on an identifier registered to the user device failing to satisfy a criterion with respect to data associated with the second message container.

5. The computer-implemented method of claim 4, further comprising preventing presentation, by the user device, of data from the second message container based at least partly on the identifier registered to the user device failing to satisfy the criterion with respect to the data associated with the second message container.

6. The computer-implemented method of claim 1, further comprising determining, in response to receiving the second message container from a third user device, to present data from the second message container based at least partly on an identifier registered to the user device satisfying a criterion with respect to data associated with the second message container.

7. The computer-implemented method of claim 6, further comprising:
presenting a visual indicator of a second location of the third user device based at least partly on location data from the second message container;
determining that an orientation of the user device with respect to the second location has changed; and
updating presentation of the visual indicator to reflect the location of the third user device with respect to the user device.

8. Non-transitory computer-readable storage having stored thereon executable instructions configured to cause a user device to at least:
generate location data representing a location of the user device within a venue;
generate recipient identifier data representing an identifier of a recipient class to which a message is directed, wherein the recipient class comprises a plurality of recipient devices located within the venue;
generate a first message container comprising the location data and the recipient identifier data;
send the first message container to a second user device, wherein the second user device is configured to determine whether to:
[i] relay the first message container from the user device to a recipient device based on the second user device not being in the recipient class, or
[ii] present the message from the first message container based on the second user device being in the recipient class;
receive a second message container, wherein the second message container is directed to the recipient class; and augment the second message container with data regarding the user device such that a reply to the second message container may be relayed via the user device.

9. The non-transitory computer-readable storage of claim 8, having stored thereon further executable instructions configured to cause the user device to:
generate time stamp data representing a time associated with generation of the first message container; and
include the time stamp data in the first message container, wherein the first message container expires a threshold period of time after the time represented by the time stamp data.

10. The non-transitory computer-readable storage of claim 8, having stored thereon further executable instructions configured to cause the user device to:
determine the location of the user device within the venue based at least partly on output of a location determination component of the user device; and
present a user-movable display object on a map representing the location of the user device.

11. The non-transitory computer-readable storage of claim 8, having stored thereon further executable instructions configured to cause the user device to determine, in response to receiving the second message container, to forward the second message container to a third user device based at least partly on an identifier registered to the user device failing to satisfy a criterion with respect to data associated with the second message container.

12. The non-transitory computer-readable storage of claim 11, having stored thereon further executable instructions configured to cause the user device to prevent presentation, by the user device, of data from the second message container based at least partly on the identifier registered to the user device failing to satisfy the criterion with respect to the data associated with the second message container.

13. The non-transitory computer-readable storage of claim 8, having stored thereon further executable instructions configured to cause the user device to determine, in response to receiving the second message container from a third user device, to present data from the second message container based at least partly on an identifier registered to the user device satisfying a criterion with respect to data associated with the second message container.

14. The non-transitory computer-readable storage of claim 13, having stored thereon further executable instructions configured to cause the user device to:
present a visual indicator of a second location of the third user device based at least partly on location data from the second message container;
determine that an orientation of the user device with respect to the second location has changed; and
update presentation of the visual indicator to reflect the location of the third user device with respect to the user device.

15. A computing device comprising:
computer-readable memory storing executable instructions; and
one or more processors in communication with the computer-readable memory and configured by the executable instructions to at least:
generate location data representing a location of the computing device within a venue;
generate recipient identifier data representing an identifier of a recipient class to which a message is directed, wherein the recipient class comprises a plurality of recipient devices located within the venue;
generate a first message container comprising the location data and the recipient identifier data;
send the first message container to a second computing device, wherein the second computing device is configured to determine whether to:
[i] relay the first message container from the computing device to a recipient device based on the second computing device not being in the recipient class, or
[ii] present the message from the first message container based on the second computing device being in the recipient class;
receive a second message container, wherein the second message container is directed to the recipient class; and
augment the second message container with data regarding the computing device such that a reply to the second message container may be relayed via the computing device.

16. The computing device of claim 15, wherein the one or more processors are configured by further executable instructions to:
generate time stamp data representing a time associated with generation of the first message container; and
include the time stamp data in the first message container, wherein the first message container expires a threshold period of time after the time represented by the time stamp data.

17. The computing device of claim 15, wherein the one or more processors are configured by further executable instructions to:
determine the location of the computing device within the venue based at least partly on output of a location determination component of the computing device; and
present a user-movable display object on a map representing the location of the computing device.

18. The computing device of claim 15, wherein the one or more processors are configured by further executable instructions to determine, in response to receiving the second message container from the second computing device, to forward the second message container to a third computing device based at least partly on an identifier registered to the computing device failing to satisfy a criterion with respect to data associated with the second message container.

19. The computing device of claim 18, wherein the one or more processors are configured by further executable instructions to prevent presentation of data from the second message container based at least partly on the identifier registered to the computing device failing to satisfy the criterion with respect to the data associated with the second message container.

20. The computing device of claim 15, wherein the one or more processors are configured by further executable instructions to determine, in response to receiving the second message container from a third computing device, to present data from the second message container based at least partly on an identifier registered to the computing device satisfying a criterion with respect to data associated with the second message container.

* * * * *